United States Patent Office 3,689,217
Patented Sept. 5, 1972

3,689,217
PROCESS FOR FREEING 55–85% SULPHURIC ACID FROM ITS IMPURITIES DUE TO METALS AND/OR SEMI-METALS
Marcel Capaul, Bonaduz, and Hermann Sauter, Domat (Ems), Switzerland, assignors to Inventa AG, Zurich, Switzerland
No Drawing. Filed June 15, 1970, Ser. No. 46,539
Int. Cl. C01b 17/90
U.S. Cl. 423—531   20 Claims

ABSTRACT OF THE DISCLOSURE

Process for removing metal impurities such as iron from 55–85% by weight sulphuric acid. The sulphuric acid is treated with a molar excess of a halide to form a complex with the impurity. The acid is then passed through an anion exchanger to purify and remove the impurities from the acid.

---

The present invention relates to a process for freeing 55–85% (by weight) sulphuric acid from its impurities due to metals and/or semi-metals.

Sulphuric acid, in particular sulphuric acid of commercial quality, contains as a rule considerable amounts of impurities. These may originate, for example, from the raw material (pyrites, crude sulphur), have their origin in the manufacturing process or get into the acid during transport and storage, for instance from the container walls.

The nature of these impurities differs very greatly, depending on origin. From crude sulphur there come, in particular, traces of arsenic, selenium, antimony, lead, mercury, copper and iron. Resulting from industrial practice or from transport and storage, iron above all makes its way into the sulphuric acid as a significant impurity; however, nickel and chromium, for example, or platinum metals (for instance from catalysts), as occurring for instance in "black acids" and waste acids, may also be contained in the sulphuric acid. The term metal impurities as used hereinafter includes either and both metals and semi-metals.

Whereas these impurities do not constitute any considerable disadvantage for many applications of sulphuric acid (for example in the manufacture of fertilizer), they have a troublesome effect in other fields of application, for example in the manufacture of pharmaceutical products, fine chemicals and other highly pure substances. Moreover, such impurities are generally undesirable in catalytic, electrolytic and biological processes.

A special example of a chemical process in which very pure sulphuric acid is required in large amounts is represented by the preparation of hydroxylamine sulphate by catalytic reduction of nitric oxide. In this case, the sulphuric acid is the most costly starting product, in particular because extremely pure sulphuric acid must be used.

Heretofore, either "chemically pure" sulphuric acid, accessible with difficulty, or sulphuric acid purified by a complicated process has had to be used for the above-mentioned purposes. The "chemically pure" sulphuric acid is produced especially by distillation of sulphur trioxide in costly apparatus (for example quartz apparatus) and is expensive in accordance with the expenditure.

Many proposals have already been made for the purification of commercial qualities of sulphuric acid. For example, according to U.S. Pat. No. 3,059,994, iron can be removed from concentrated sulphuric acid by adding aluminium salts. According to German patent specification 578,034, this can be achieved by adding aluminium or aluminium alloys.

According to German Laid-open patent specification 1,166,752, dilute salt-containing sulphuric acid can be purified by concentration, filtering off the salt sediment, highly concentrating the filtrate and separating salt sediment once more. According to German Pat. No. 1,124,024, dilute commercial sulphuric acid can be purified by treating the acid with hydrogen sulphide in the presence of activated carbon, separating the carbon and then destroying the residual hydrogen sulphide with hydrogen peroxide in the presence of more activated carbon. This method, however, is very costly and is primarily suitable when large amounts of impurities are present. Moreover, only those impurities which form sulphides insoluble in the acid can be removed. Consequently, the most frequent impurity, namely the iron, cannot be removed. Furthermore, this process is suitable only for dilute sulphuric acid.

A process for freeing 55–58% (by weight) sulphuric acid from its impurities in the form of metals and/or semi-metals has now been found which avoids the drawbacks heretofore known and which consists in that small amounts of halides and, if necessary, small amounts of oxidizing agents are added to the sulphuric acid, the acid is then treated with an anion exchanger, the anion exchanger is regenerated after exhaustion and, if necessary, the separated impurities are isolated.

The sulphuric acid to be purified is preferably 75–80% acid (percent by weight); this applies especially to the case where the impurities consist chiefly of iron. The most frequent impurities, besides iron, are selenium, arsenic, antimony, lead, mercury, copper nickel, cobalt and occasionally also precious metals, for example platinum metals, and others.

Primarily, the halides to be mentioned are chlorides, in particular hydrochloric acid or ammonium chloride. Other halides, such as the bromides including hydrogen bromide, may be used. In fact, any halide such as the alkali and alkaline earth halides will successfully serve the purpose of this invention provided the corresponding cations or the sulphates formed are not undesirable and will not hinder the subsequent removal of the metal impurities as halocomplexes by the anion exchanger.

It is appropriate to employ these halides in a molar excess preferably 10–200 times, referred to the impurities, which are determined previously. For example, 0.1–1% by volume of concentrated hydrochloric acid or 0.2–2.5% by volume of saturated ammonium chloride solution is used.

Accordingly, a preferred method of carrying the process according to the invention into effect consists in that the sulphuric acid, freed from solid constituents, is brought to 55–85% by weight (to remove iron, preferably to 75–80% by weight) and a molar excess of chloride ions which is about 10–200 times in relation to the content of metals and/or semi-metals in the crude sulphuric acid, for example 0.1–1% by volume of concentrated hydrochloric acid or 0.2–2.5% by volume of saturated ammonium chloride solution, is then added. The contaminating metals and/or semi-metals (metal impurities) are converted into their anionic chlorocomplexes and can consequently be separated as such by the anion exchanger.

If the contaminating metallic ions are present in lower valency stages, for example Fe II, Sb III, etc., it is often advantageous to convert them to the higher oxidation stages by adding very small amounts of oxidizing agents sufficient to effect such oxidation, for example hydrogen peroxide, nitric acid, persulphates, etc., and thereafter remove them in accordance with the invention from the sulphuric acid.

The sulphuric acid treated in this way is advantageously passed in known manner through a tower charged with anion exchange resin. As exchange resins there may be used almost all commercial resins with quaternary ammonium groups. Examples of these are the resins available under the trade names Dowex 1, Amberlithe IRA 93 and IRA 410, and Permutit EM 10.

The purification process can be carried out at room temperature although the temperature is not critical and may vary from 0–100° C., preferably it is 10°–60° C. The dwell time of the acid to be purified in the resin also is not critical but may be approximately ½ to 1½ hours up to several hours. The purifying effect of the tower employed depends mainly on the concentration of the sulphuric acid, the concentration of the halide and the dwell time. In addition, the type of resin and the amount and composition of the impurities play a certain part.

For most purposes, the small chloride content of the acid purified in accordance with the invention is of no importance, especially in the above-mentioned synthesis of hydroxylamine sulphate. If necessary, the chloride may be partly or completely expelled in known manner as hydrogen chloride gas, for example by blowing out and/or evacuation.

The regeneration of the gradually exhausted anion exchanger is effected advantageously by treating it with sulphuric acid the concentration of which is below 50% (by weight). To this end, it is suitable to reduce the concentration of the sulphuric acid to be purified to the desired concentration below 50% and then use it as the regenerating agent.

The process may be carried into effect either discontinuously or continuously. In the first case, the anion exchanger is alternately loaded and regenerated. In the continuous process, for example, a plurality of columns are either so operated in parallel and regenerated as required that uninterrupted purification of the sulphuric acid is fully insured, or they are connected in series and that column which is most heavily loaded at any given time can be regenerated as required.

The continuous method, in particular "connection in series," is preferred.

The impurities are then obtained in sulphuric acid solution and can be isolated therefrom by conventional methods. This is appropriate in particular where the impurities are costly substances, such as precious metals, rare elements, etc. Consequently, the isolation of these substances may also become the main interest.

The principal advantages of the process according to the invention reside in the first place in the simple and economic procedure, the possibility of employing conventional apparatus technique and the absence of mechanically operated parts; moreover, more highly concentrated sulphuric acid can be purified. The process furthermore operates at room temperature if desired and, in contrast to conventional regeneration with bases or salts, it does not require any special regenerating agent.

EXAMPLE 1

(a) Without the addition of halide
(comparative example)

105 ml. of 78% sulphuric acid (percent by weight) with an iron (III) content of 55.2 mg. per litre are shaken for several hours with 15 g. of anion exchange resin (Dowex 1) in the sulphate form. After separation of the resin, the iron content of the sulphuric acid is 52.8 mg. per litre. Thus, only 4.3% of the iron contained in the original acid has been removed.

(b) With the addition of halide

To an equal sample amount of sulphuric acid with an iron (III) content of 51.8 mg. per litre there is added an amount of 1.0 ml. of concentrated hydrochloric acid and the sample is treated in the same manner as that described above. The iron content remaining is only 1.65 mg. per litre. Consequently, 96.8% of the iron has been removed.

EXAMPLE 2

105 ml. of 78% sulphuric acid (percent by weight) with an iron (II) content of 51.8 mg. per litre and to which 1.0 ml. of concentrated hydrochloric acid and 0.2 ml. of hydrogen peroxide have been added are treated with 15 g. of Dowex 1 in the same way as is described in Example 1. The sulphuric acid thereafter contains 0.5 mg. of iron per litre. Thus 99.1% of the iron has been removed.

EXAMPLE 3

Another test, in which, instead of 1.0 ml. of concentrated hydrochloric acid, 0.7 g. of ammonium chloride (amount equivalent to the hydrochloric acid) is used and the same procedure as in Example 2 is adopted in other respects, yields a purified sulphuric acid containing 0.6 mg. of iron per litre. Accordingly, 98.8% of the iron is removed.

EXAMPLE 4

105 ml. of 78% sulphuric acid (percent by weight) with a platinum (IV) content of 47.5 mg. per litre and to which 1.0 ml. of concentrated hydrochloric acid has been added are treated with 15 g. of Dowex 1 in the same manner as that described in Examples 2 and 3. The sulphuric acid thereafter contains 0.9 mg. of platinum per litre. Thus, 98.1% of the platinum is removed.

EXAMPLE 5

3 ml. of concentrated hydrochloric acid are added to 315 ml. of a 75% sulphuric acid (percent by weight) containing 3.4 mg. of lead per litre and this acid is treated with 50 g. of Dowex 1. After separation of the anion exchanger, 0.87 mg. of lead per litre is found in the solution. Consequently, about 75% of the lead is removed.

EXAMPLE 6

A column is filled with 43.3 g. of Dowex 1 anion exchange resin. First of all, dilute sulphuric acid is gradually concentrated to 78 percent by weight during the percolation. The sulphuric acid to be purified, which is likewise 78 percent by weight and contains 47.4 mg. of iron (III) per litre and 0.5% by volume of concentrated hydrochloric acid, is then percolated. With a percolation rate of 50 ml. per hour, the following iron contents are found in the percolate in dependence upon the percolated volume:

| Percolated volumes in litres, up to about: | Mg. of iron per litre of percolate |
|---|---|
| 5 | 0 |
| 10 | 1 |
| 15 | 2 |
| 20 | 3 |
| 25 | 4 |
| 30 | 6 |
| 35 | 7 |
| 40 | 8 |

Consequently, in the single-column method, after an amount of percolate of 40 litres, 83% of the iron is still retained.

To regenerate the anion exchanger which is loaded as hereinbefore described, the concentration of the sulphuric acid is lowered by degrees to 40 percent by weight without adding Cl⁻. When this concentration is reached, the separation of the iron sets in very markedly and 90% of the iron retained on the resin is eluted with 300 ml. of 40% sulphuric acid (percent by weight). Maximum iron concentrations of more than 6000 mg. per litre occur. If desired, the regeneration can be made quantitative with another portion of 300 ml. of 40% sulphuric acid (percent by weight). Thereafter, a total of about 1750 mg. of iron will have been eluted.

EXAMPLE 7

A column is prepared as in Example 6 and is fed with a 78% sulphuric acid (percent by weight) which contains 36 mg. of iron per litre, 5.2 mg. of arsenic per litre, 0.1% by volume of hydrogen peroxide and 3.3 g. of ammonium chloride per litre. After the purification of the sulphuric acid has followed the same course as in Example 6, another similarly prepared column is connected up at the outlet side after 25 litres of sulphuric acid have passed through. After another 25 litres, a third column, which contains Amberlithe IRA 93 instead of Dowex 1, is connected up.

After the first 24 litres of percolate, the first column shows an iron breakthrough of 4.5 mg. per litre. After the second column has been connected up, the percolate is initially free from iron and, after another 25 litres of sulphuric acid have percolated, contains about 4 mg. of iron per litre. The position is the same when a third column has been connected up.

Thus, by this procedure, far more acid can be percolated without the iron content in the percolate rising, for example, above 5 mg. per litre. The utilization of the capacity of the resin can therefore be greatly increased by means of this connection in series of a plurality of columns.

After 25 litres of percolate from the first column, analysis for arsenic shows 2.0 mg. of arsenic per litre, which is equivalent to a 62% purifying action. By connecting up a second and, finally, a third column, similarly to the method hereinbefore described, the arsenic content can be kept below 2.5 mg. per litre.

EXAMPLE 8

0.15 ml. of 63% by weight hydrogen bromide solution is added to 150 ml. 78% by weight sulphuric acid with a mercury (II) content of 25 mg./l. and this mixture is treated with 20 g. of Permutit EM 10 anion exchanger. After separating the Permutit, 4.4 mg. per litre of mercury were still found in the solution, which corresponds to a removal of 82.4%.

Dowex 1 (Dow Chemical Corp., Midland, Mich., USA) is a strongly basic resin (quaternary $NH_4^\oplus$ functionality) of Type I, that is to say of the 4 nitrogen substituents, 3 are methyl groups and one is a polymeric benzyl group

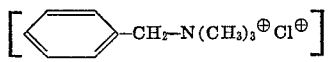

Amberlithe IRA 93 (Röhm & Haas, Philadelphia, Pa., USA) is a weakly basic resin (ternary amine functionality in a styrenedivinyl benzene matrix) —$N(R)_2$. Amberlithe IRA 410 (Röhm & Haas, Philadelphia) is a strongly basic resin:

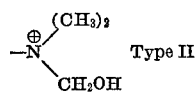 Type II

Permutit EM 10 (Aktiengesellschaft Auguste-Viktoria-Str. 62, 1 Berlin 33, Federal Republic of Germany) corresponds chemically to the Amberlithe IRA 93.

We claim:

1. Process of removing one or more of the following metal impurities: iron, selenium, arsenic, antimony, lead, mercury, copper, nickel, cobalt, precious metals normally present in 55–85% by weight sulphuric acid comprising: treating the sulphuric acid with a molar excess of a halide of the group consisting of hydrogen, ammonium, alkali metal, and alkaline earth halides to convert said metallic impurities into anionic halocomplexes and passing the acid so treated through an anion exchanger for purification to remove said anionic halocomplexes from said acid.

2. Process according to claim 1, wherein 75–80% by weight sulphuric acid is employed and regenerating said exchanger after exhaustion thereof by treatment with sulphuric acid of less than 50% concentration.

3. Process according to claim 2, wherein the halide is selected from chlorides and bromides.

4. Process according to claim 3, wherein the molar excess of the halides is 10–200 times.

5. Process according to claim 1, wherein the process is performed continuously and in a purality of columns connected in series.

6. Process of claim 1 wherein the halide is selected from hydrochloric acid, hydrogen bromide and ammonium chloride.

7. Process of claim 6 wherein the molar excess of the halide is 10–200 times.

8. Process of claim 6 wherein the regeneration of the anion exchanger is carried out by sulphuric acid obtained by initial partial lowering of the concentration of the 55–85% by weight sulphuric acid to a concentration below 50% by weight.

9. Process of claim 7 wherein 75–80% by weight sulphuric acid is employed.

10. Process of claim 8 wherein 75–80% by weight sulphuric acid is employed.

11. Process of claim 10 wherein the metal impurity includes iron.

12. Process of claim 1 including adding an amount of oxidizing agent sufficient to oxidize said impurities to a higher valence stage.

13. Process of claim 1 wherein the temperature is room temperature.

14. Process of claim 4 wherein the dwell time for purification is up to several hours at a temperature between 0° and 100° C.

15. Process of claim 4 wherein the halide is a chloride, the purification dwell time 0.5–1.5 hours at a temperature of 10°–60° C.

16. Process of claim 15 wherein the regeneration of the anion exchanger is carried out by sulphuric acid obtained by initial partial lowering of the concentration of the 55–85% by weight sulphuric acid to a concentration below 50% by weight.

17. Process of claim 16 wherein the halide is selected from hydrochloric acid, hydrogen bromide and ammonium chloride.

18. Process of claim 17 wherein the temperature is room temperature.

19. Process of claim 18 wherein 75–80% by weight sulphuric acid is employed.

20. Process of claim 19 wherein an amount of oxidizing agent sufficient to oxidize said impurities to a higher valence stage is added.

References Cited

UNITED STATES PATENTS

| | | | |
|---|---|---|---|
| 2,254,788 | 9/1941 | Ballard | 23—172 |
| 2,975,029 | 3/1961 | Horton et al. | 23—172 |
| 3,132,095 | 5/1964 | Wolf et al. | 23—172 X |
| 3,205,168 | 9/1965 | Mihara et al. | 23—172 X |
| 3,306,702 | 2/1967 | Odland et al. | 23—172 X |

FOREIGN PATENTS 361,509   11/1931   England  23—173

OSCAR R. VERTIZ, Primary Examiner

CHARLES B. RODMAN, Assistant Examiner

U.S. Cl. X.R.

260—703